United States Patent [19]

Hoffman, III

[11] Patent Number: 4,930,859

[45] Date of Patent: Jun. 5, 1990

[54] FIBER OPTIC SPLICE ASSEMBLY

[76] Inventor: Arthur J. Hoffman, III, R.D. 2, Box 502, Montgomery, Pa. 17752

[21] Appl. No.: 403,014

[22] Filed: Sep. 7, 1989

Related U.S. Application Data

[63] Continuation of Ser. No. 916,666, Oct. 8, 1986, abandoned.

[51] Int. Cl.⁵ .............................................. G02B 6/38
[52] U.S. Cl. ............................................... 350/96.21
[58] Field of Search ............... 350/96.20, 96.21, 96.22

[56] References Cited

U.S. PATENT DOCUMENTS

| 4,585,304 | 4/1986 | Winter et al. | 350/96.21 |
| 4,832,440 | 5/1989 | Anderton | 350/96.21 |

FOREIGN PATENT DOCUMENTS 0104416  4/1984  European Pat. Off. ......... 350/96.20

Primary Examiner—John D. Lee
Attorney, Agent, or Firm—William H. McNeill

[57] ABSTRACT

Mechanical fiber optic splices are effectuated by a splice sleeve having an integral fiber guide in one end; a middle portion for receiving a pair of mated elastomers; and a second end for receiving a separate fiber guide. Vent holes are provided allowing better adhesive flow.

2 Claims, 1 Drawing Sheet

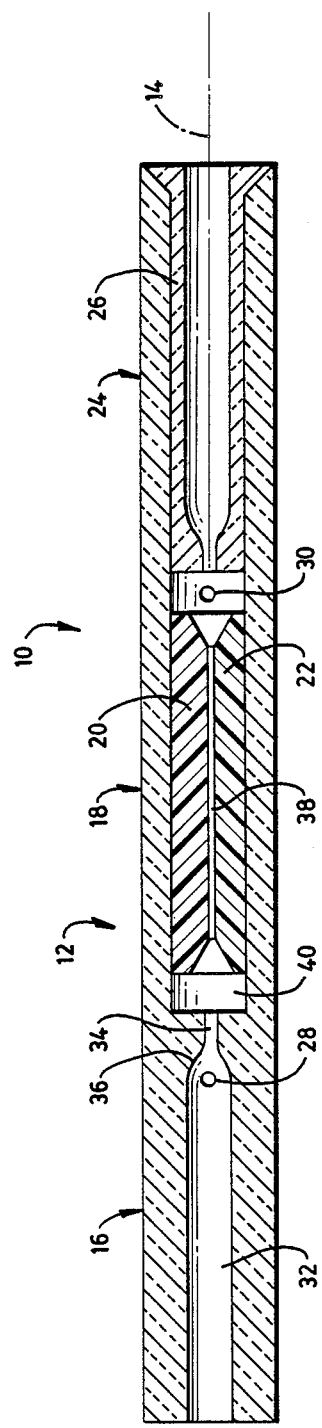

FIBER OPTIC SPLICE ASSEMBLY

This application is a continuation of application Ser. No. 916,666 filed 10/8/86 abandoned.

TECHNICAL FIELD

This invention relates to optical fiber splicing and more particularly to a mechanical splice employing a novel assembly.

BACKGROUND ART

At the present time there are two main methods of splicing optical fibers- fusion splicing and mechanical splicing.

Fusion splicing is performed by aligning the cores, or light propagating regions, of the two fibers so that minimal light loss occurs at the junction. Next, a flame or electrical arc is used to soften or melt the optical fibers to the point where they are welded or fused together. This technique is usually very operator sensitive, cannot be quickly performed, requires expensive and delicate equipment, and requires electrical power either via voltage or batteries. Furthermore, because the technique involves the use of a spark or flame, it poses a safety problem if used in hazardous environments such as manholes or mines.

Mechanical splicing can be subdivided into several different techniques: chip or array, crimp, epoxy and polish, four or three rod, and elastomeric.

Chip splicing involves the placement of a single fiber, or multiple (array) fibers, onto a substrate. This substrate has precision machined or etched v-grooves running longitudinally along its top surface. Each groove is of such dimension as to permit the fiber to rest within it. In preparation for splicing, a portion of each fiber's protective coating is removed, and the fiber ends are cleaved or polished to achieve a perpendicular fiber end face. One of the fibers to be spliced is inserted into its v-groove so that it extends halfway along the length of the substrate. The fiber that is to be spliced to the fiber in the groove is then inserted into the same groove until it butts against the first fiber. Next, the fibers are secured onto the chip using an adhesive. Once the adhesive has cured, the splice is complete.

Disadvantages of this technique are that the substrates are difficult to accurately manufacture, and the v-grrooves do not permit the fiber cores to be accurately aligned via "optimization" or manual tuning.

The crimp type splice involves the same fiber end preparation as the chip splice. Once the fiber ends are prepared, an optical coupling compound is applied to each fiber end face, and the two fibers to be joined are centered, end-to-end, on a metal substrate that has several longitudinal ridges. After the fibers are positioned, the metal substrate is formed around the fibers using a special tool. This tool causes the metal substrate to hold the fibers securely in place and in proper alignment. The splice is then complete.

The crimp technique creates several conditions that can be detrimental to the fiber in terms of life and performance. These include: metal applying pressure to a glass optical fiber can introduce microcracks to the fiber, the bare fibers are not protected or sealed from the environment permitting moisture to attack them, and the fiber alignment cannot be optimized.

The epoxy and polish technique is very similar to fiber optic connector assembly. The coating on the fiber is removed at the ends. Each fiber is then inserted into a ferrule which contains a precision drilled hole at one end. The fiber is epoxied into the ferrule so that some bare fiber extends out of the precision drilled hole. Once the epoxy is cured, the fiber ends are polished perpendicular to the ferrule axis using abrasive techniques. The ferrules of the two fibers to be spliced are then inserted into a receptacle with a precision longitudinal bore filled with optical coupling compound. The fiber cores are then in alignment or the ferrules can be rotated until optimal alignment is achieved. Once aligned, the ferrules are held within the receptacle via mechanical clamps or nuts or adhesives.

The epoxy and polish splice technique has the disadvantage that it is expensive due to the precision of its three components, and the fiber end preparation is difficult to perform in the field and time consuming.

The three or four rod techniques of splicing are the same as the chip splicing except that the fibers are inserted into the interstitial space formed by three or four rigid rods that are secured together. The fibers are held into the rod assembly using an adhesive.

This technique makes optimization difficult, and in most cases impossible. Further, the joint may or may not be adequately sealed from the environment-leading to reliability problems.

The mechanical elastomeric splice is a technique shown and described in U.S. Pat. No. 4,257,674, and the teachings thereof are incorporated herein by reference, and involves the same coating removal and fiber cleaving technique as required for chip splicing. The fibers are bonded into the glass fiberguides of the splice with an ultraviolet curing adhesive after they are inserted into the splice and optimized. Prior to field installation, two resilient elastomer halfhexes, one of which has a precision, longitudinal, index matching gel filled, v-groove on its widest face, are inserted into the middle of a glass sleeve. Next, two precision glass fiberquides are inserted into the glass sleeve, one in each end, and bonded thereto. These fiberquides are available in three sizes, depending on the coating diameters of the fibers to be spliced. The "splice assembly" is then ready for field use.

The disadvantage of this technique is that the field installer must know the coating diameter of the fiber to be spliced in order that he can select the splice with the proper fiberquides. This is often very difficult to quickly determine, especially in emergency situations where access to cable/fiber information is very limited. Also, the adhesive used to bond the fibers into the fiberquides cannot wick fully into the fiberquides because of air trapped within the tube. This makes it possible to have an inadequate bond to the bare fiber, which can cause poor environmental performance. Similarly, the ultraviolet curing adhesive requires an ultraviolet light source, which may not be readily available in an emergency. Also, because the tube and fiberquides are glass, they can be easily broken or chipped if mishandled, thus making them unusable. This can be very expensive.

DISCLOSURE OF INVENTION

It is, therefore, an object of this invention to obviate the disadvantages of the prior art.

It is another object of the invention to enhance mechanical fiber optic splices.

Yet another object of the invention is the provision of a universal splice assembly.

These objects are accomplished, in one aspect of the invention, by the provision of a fiber optic splice assembly which comprises an elongated, tubular splice sleeve having a longitudinal axis and a first end formed to receive and align an optical fiber. A middle portion of the sleeve is formed to receive a mated pair of elastomeric halves and a second end is formed to receive an optical fiber guide. Two vent holes are formed in a wall of the sleeve, one hole on either side of the middle portion and extending from the interior of the sleeve to the exterior thereof.

The elastomeric splice with universal fiber guides eliminates the problems associated with the elastomeric splice with glass package as follows. The package and fiberquides are preferably molded of a state-of-the-art low-expansion plastic. This increases the solice's ability to withstand abusive handling without breakage. In order to facilitate wicking of the adhesive, thereby providing a better bond to the fiber, vent holes are provided at each internal end of the fiberquides. This permits any entrapped air within the package to be displaced by adhesive. Also, this design permits the use of alternate adhesives, such as cyanoacrylates and epoxies, that do not require special lamps or heat sources for curing. By molding the fiber guides with one end that accommodates all fiber coatings and another end that accommodates all applicable fiber diameters, the need for selecting a splice based on fiber coating diameter is eliminated. Furthermore, instead of a three component package (1 tube+2 fiber guides) this splice requires only two components (1 tube+1 fiber guide). This makes the manufacture of the splice less labor intensive.

BRIEF DESCRIPTION OF THE DRAWING

The single FIGURE is an elevational, section view of an embodiment of the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawing.

Referring now to the drawing with greater particularity, thre is shown in the FIGURE a fiber optic splice assembly 10 comprising an elongated tubular splice sleeve 12 having a longitudinal axis 14 and a first end 16 formed to receive and align an optical fiber. A middle portion 18 is formed to receive a mated pair of elastomeric halves 20 and 22 of the type disclosed in the aforementioned U.S. Pat. No. 4,257,674.

A second end 24 of sleeve 12 is formed to receive an optical fiber guide 26. At least two vent holes 28 and 30 are formed in a wall of sleeve 12, one on either side of middle portion 18, and extend from the interior of sleeve 12 to the exterior thereof.

The first end 16 contains a first diameter 32 which leads to a second smaller diameter 34. The first diameter 32 is larger than all common fiber coatings and diameter 34 is slightly larger than the largest diameter fiber that can be used with the splice. The connectin between first diameter 32 and second diameter 34 is a gentle taper 36 to guide the bare fiber into the groove 38 in elastomer 22.

As will be seen from the FIGURE, the middle portion 18 and second end 24 have a constant internal diameter 40 that is larger than the first diameter 32. The optical fiber guide 26 has an outside diameter equal to diameter 40 for a close fit therein and interior diameter 32', 34' identical to first and second diameter 32 and 34, respectively.

A preferred material for the splice sleeve 12 and the optical fiber guide 26 is a low expansion plastic known as Vector A-150 available from Celanese Corp.

While there have been shown and described what are at present considered to be the preferred embodiments of the invention, it will be apparent to those skilled in the art that various changes and modifications can be made herein without departing from the scope of the invention as defined by the appended claims.

I claim:

1. A fiber optic splice assembly comprising: an elongated tubular splice sleeve having a longitudinal axis and a first end formed to receive and align an optical fiber, said first end including a first diametered bore extending a given distance inwardly of said sleeve and tapering to a narrower, second diametered bore, said first diametered bore being of a size to receive a coated fiber and said second diametered bore being of a size to receive a stripped fiber; a middle portion and a contiguous second end, each having a third diametered bore, larger than said first diametered bore, said middle portion containing a mated pair of elastomeric halves therein; said second end containing a fiber guide comprised of a cylindrical member having an outside diameter equal to the diameter of said third diametered bore, said fiber guide including a fourth diametered bore extending a given distance inwardly of said guide and tapering to a narrower, fifth diametered bore, said fourth diameter being equal to said first diameter and said fifth diameter being equal to said second diameter.

2. The assembly of claim 1 wherein a first vent hole is provided in said first diametered bore, adjacent said second diametered bore and a second vent hole is provided in said third diametered bore between an end of said mated pair of elastomeric halves and the inner end of said fiber guide.

* * * * *